United States Patent [19]

Lemaire et al.

[11] Patent Number: 4,897,019
[45] Date of Patent: Jan. 30, 1990

[54] DEVICE FOR TAKING CONTAINERS OUT OF A PILE AND PROCESSING MACHINE EQUIPPED WITH THIS DEVICE

[75] Inventors: Didier Lemaire, Cherisy; Jean-Marc Dronet, Putanges Pont Ecrepin, both of France

[73] Assignee: E. P. Remy & Cie., France

[21] Appl. No.: 182,982

[22] Filed: Apr. 18, 1988

[30] Foreign Application Priority Data

Apr. 24, 1987 [FR] France .................. 87 05847

[51] Int. Cl.⁴ .................. B65G 59/06; B65G 59/10
[52] U.S. Cl. .................. 414/795.6; 221/223; 221/238; 221/242; 221/297; 414/798.1
[58] Field of Search .............. 414/115, 126, 900, 917, 414/795.6, 798.1; 221/223, 238, 297, 242

[56] References Cited

U.S. PATENT DOCUMENTS

| 1,958,845 | 5/1934 | Burns | 414/900 X |
| 2,602,556 | 7/1952 | Sheehan | 221/297 X |
| 2,618,394 | 11/1952 | Miller . | |
| 3,420,407 | 1/1969 | Christine et al. | 221/221 |
| 3,958,720 | 5/1976 | Anderson | 221/223 X |

Primary Examiner—Robert J. Spar
Assistant Examiner—Janice Krizek
Attorney, Agent, or Firm—Steinberg & Raskin

[57] ABSTRACT

The present invention concerns a device for taking containers out of a pile, comprising a magazine formed of a row of articulated parallelograms and, under this magazine, two superimposed rows of deformable parallelograms which are actuatable independently from each other to take the containers out of the pile and which can conform to any container shape or dimension.

5 Claims, 2 Drawing Sheets

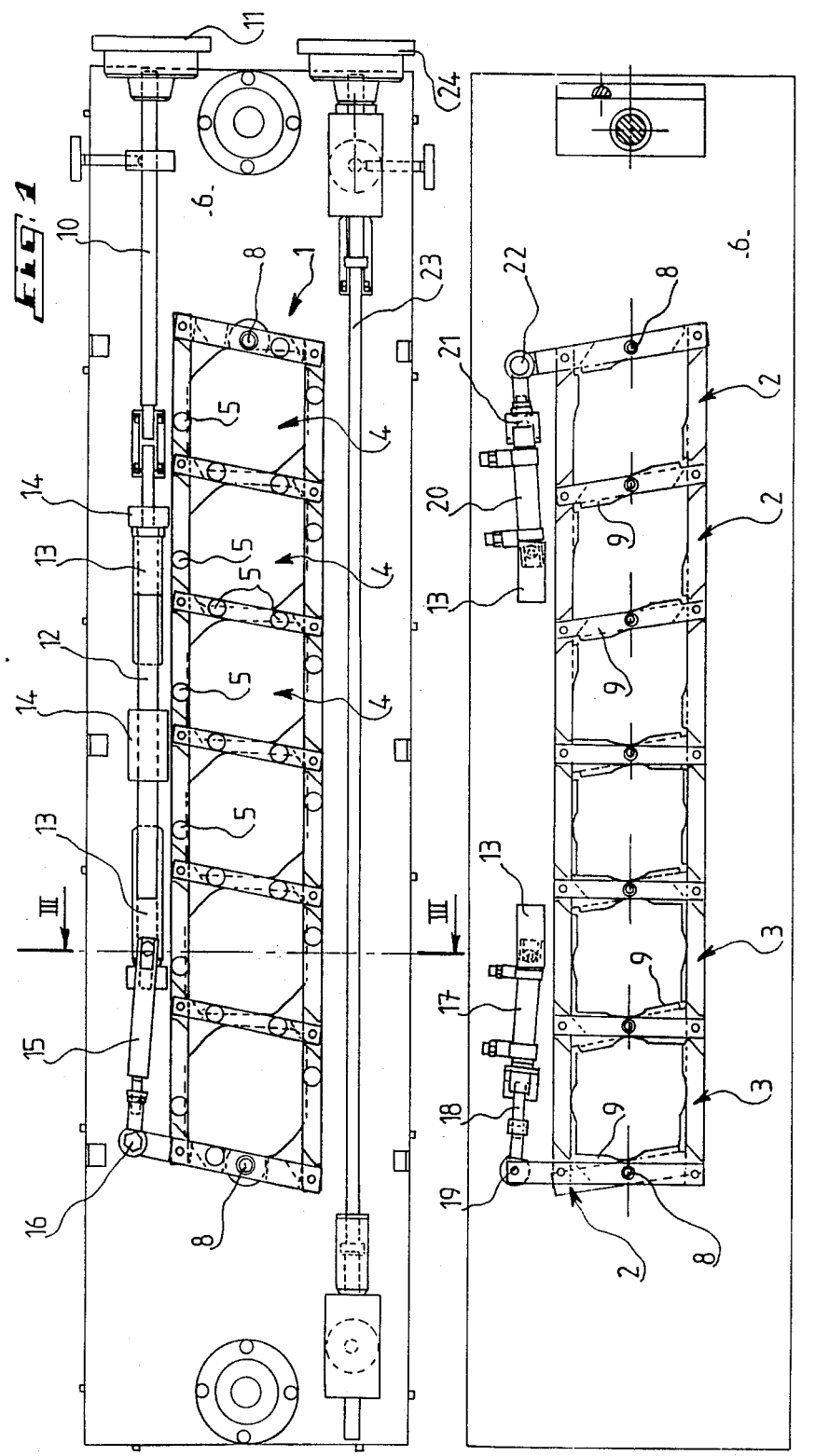

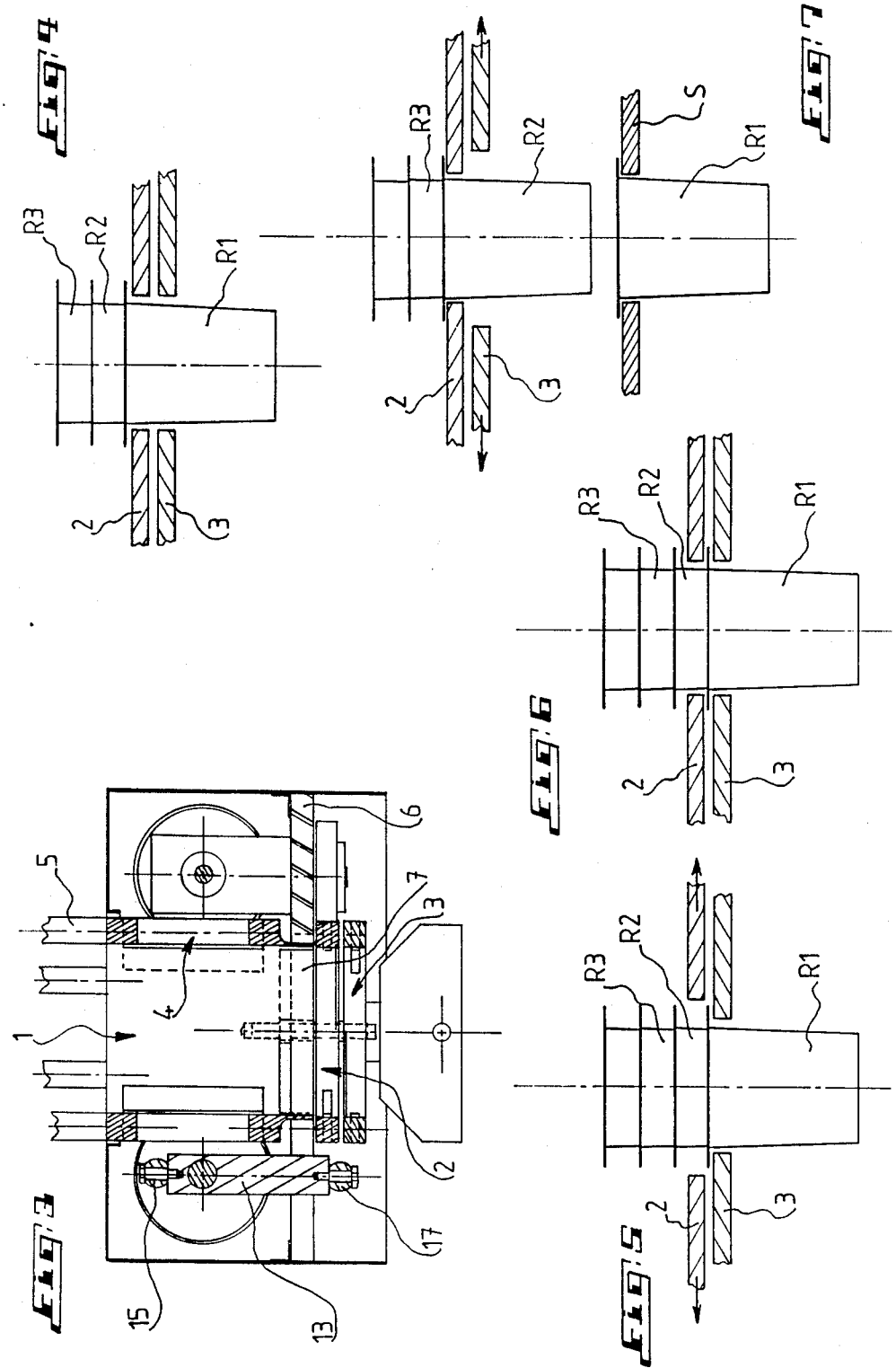

DEVICE FOR TAKING CONTAINERS OUT OF A PILE AND PROCESSING MACHINE EQUIPPED WITH THIS DEVICE

BACKGROUND OF THE INVENTION

The present invention has essentially as an object a device for taking containers such as for example goblets or pots out of a pile.

The invention concerns also a machine for processing containers equipped with the above device.

The machines for processing containers comprise generally a station for taking containers out of a pile, this station being substantially formed of a magazine in which the containers are piled up within one another and under which they may be provided means which permit taking the containers one by one out of the pile of containers in the magazine.

However, the magazine containing the piled up containers which include generally a shoulder, cannot conform to various container shapes or dimensions. The same holds true concerning the means located under the magazine which enable the containers to be taken out one by one from the pile.

Thus, when it is desired to process on a machine several rows of containers having different shapes and/or dimensions, it is necessary to transform or to change the station for taking the container out of the pile after each row of containers has been processed.

The means provided on the conveyor of the machine to receive and carry the containers coming from the station for taking the containers out of a pile had to be replaced, for each new row of containers to be processed.

It will be understood that all this is expensive as regards the labour and the substitute systems to be provided concerning the station for taking containers out of a pile as well as concerning the conveyor of the machine receiving the containers to be processed.

SUMMARY OF THE INVENTION

Therefore, the present invention has as an object to obviate the above drawbacks by proposing a system for taking containers out of a pile which can conform to any shape or dimension of containers or goblets intended in particular to be subjected to various operations on a processing machine.

To this end, the invention has as an object a device for taking containers out of a pile, such for example as goblets, which are piled up in a magazine and comprising means which permit taking the containers one by one out of the pile of containers in the magazine, characterized in that the said means located under the magazine are formed of two superimposed deformable parallelograms which are actuatable independently from each other to take the containers one by one out of the pile, and which can conform to any container shape and/or dimension.

It is to be precised here that according to another feature of the invention, each one of the two aforesaid parallelograms comprises at least one tongue projecting towards the interior of the parallelogram and on which the shoulder located at the upper part of the containers can rest.

According to still another feature of the invention, the aforesaid magazine is formed itself of a deformable parallelogram which can conform to any container shape and/or dimension.

It is to be precised here that the deformation of the parallelogram forming the magazine as well as the deformation of the two underlying superimposed parallelograms are simultaneously controlled by an appropriate system, such for example as a system with rods and nuts, to conform to the shape and/or the dimension of the containers to be taken out of the pile.

According to still another feature of the invention, the two aforesaid superimposed parallelograms are separately deformable by means, such for example as a jack, associated with each one of these two parallelograms and preferably with the aforesaid system with rods and nuts.

It is still to be noted that each one of the aforesaid parallelograms is advantageously part of a row of deformable parallelograms formed of articulated small rods.

The invention concerns also a machine for processing containers, such for example as goblets, comprising at least one endless chain conveyor or the like above which are disposed several stations, one of them being a station for taking containers out of a pile, this machine being characterized in that it is equipped with a device for taking containers out of a pile presenting one and/or the other of the above features.

BRIEF DESCRIPTION OF THE DRAWINGS

Other features and advantages of the invention will appear more clearly in the following detailed description with reference to the appended drawings given by way of example only and wherein:

FIG. 1 is a top view of a station for taking containers out of a pile according to the invention;

FIG. 2 is a bottom view of this station;

FIG. 3 is a cross-sectional view along line III—III of FIG. 1; and

FIGS. 4 to 7 illustrate diagrammatically the different phases through which the containers intended for example to be deposited on the carrying run of a conveyor belonging to a machine for processing containers are taken one by one out of a pile.

DESCRIPTION OF THE PREFERRED EMBODIMENTS

According to an embodiment, and referring to the appended drawings, a device for taking containers out of a pile according to this invention comprises essentially a magazine 1 in which containers, such for example as goblets, can be piled up, and, under this magazine, two deformable and superimposed parallelograms 2 and 3.

The magazine 1 is formed of a deformable parallelogram 4 also so as to be in a condition to conform, as well as the deformable superimposed parallelograms 2 and 3, to any container shape and/or dimension.

Actually, as clearly seen in FIG. 1, the deformable parallelogram forming the magazine 1 comprises a row of deformable parallelograms 4 formed of articulated small rods.

The same holds true concerning the superimposed parallelograms 2 and 3 which, as clearly seen in FIG. 2, comprise also a row of deformable parallelograms 2 and 3 formed of articulated small rods.

There is shown at 5 in FIGS. 1 and 3 vertical rods for guiding the piled up containers, these rods being solid with the small rods forming the row of deformable parallelograms 4 forming the magazine 1.

In FIG. 3, there is seen that the parallelograms 4 forming the magazine and the superimposed parallelograms 2 and 3 located under this magazine are hinged on a plate 6 forming in a way the supporting structure of the station for taking containers out of the pile and comprising openings 7 through which the containers can pass.

At 8 in FIGS. 1 and 2 are shown pins for the swiwelling of the parallelograms 2, 3 and 4 on plate 6.

The articulated small rods forming the row of parallelograms 2 and the row of parallelograms 3 comprise tongues 9, clearly seen in FIG. 2 and projecting towards the interior of the parallelogram so as to permit the containers to be carried through their shoulders, after the said parallelograms have been deformed so as to conform to the shape or to the dimension of the container or goblet to be processed.

In this respect, the deformable parallelograms 4 of magazine 1, as well as the deformable parallelograms 2 and 3 under this magazine can be simultaneously defomed by a system appearing in particular in FIG. 1.

According to a preferred embodiment, this system comprises a rod 10 carried by the plate 6, whose rotation is controlled by a button or a crank 11 and which is connected to a screw-forming threaded rod 12 meshing with nuts 13.

There are shown at 14 bearings in which the threaded rod 12 rotates.

The nut 13 located in the left-hand part of FIG. 1 is coupled to a connecting rod 15 hinged at 16 on the deformable parallelograms 4 forming the magazine 1, so as to permit the deformation of these parallelograms in order that they conform to the shape and/or to the dimension of the containers.

The aforesaid nut 13 is also coupled to the body of a jack 17 whose rod 18 is hinged at 19 on the articulated parallelograms 3, as seen in FIG. 2.

As for the nut 13 visible in the right-hand part of FIGS. 1 and 2, it is coupled to the body of a jack 20 whose rod 21 is hinged at 22 on the group of parallelograms 2 superimposed on parallelograms 3.

There is shown at 23 in FIG. 1 a rod actuatable with a crank 24 and likely to adjust the height of the magazine formed of the parallelograms 4.

From the foregoing it is therefore understood that by actuating the crank 11, the nuts 13 will move on the screw 12 to simultaneously control the deformation of the deformable articulated parallelograms 4, 3 and 2. Thus, the magazine 1 and the rows of underlying parallelograms 2 and 3 will conform to the shape and to the dimensions of the containers.

This being done, use will be made of the jacks 17 and 20 to separately and respectively control the parallelograms 3 and 2, in order to permit the containers piled up according to a row inside the deformable parallelograms 4 forming the magazine 1 to be taken one by one out of the pile.

For the sake of clarity, the different phases of taking the containers out of the pile will now be described in detail with reference to FIGS. 4 to 7.

As previously explained, the parallelograms 4, 2 and 3 are first conformed to the shape or to the dimension of the piled up containers $R_1, R_2, R_3 \ldots R_N$ by actuating the crank 11, so that the upper shoulder of the first container $R_1$ of the pile rests on the parallelograms 2 located under the magazine 1, and this through the tongues 9.

That is what is seen in FIG. 4 where the tongues 9 were not shown for the sake of clarity.

The jack 20 which controls the deformation or the opening of the parallelograms 2 is then actuated which, as seen in FIG. 5, allows the pile of containers to drop which rests through the container $R_1$ on the parallelograms 3 lying under the parallelograms 2.

Then the jack 20 is actuated again which provokes the closing of the parallelograms 2, which come between the shoulder of the container $R_1$ and the shoulder of the container $R_2$ which will therefore be kept back, as seen in FIG. 6.

Finally, as seen in FIG. 7, the jack 17 is actuated which provokes the opening of the parallelograms 3, which releases the container $R_1$, which will be deposited on supports S transversally solid with the chains of a conveyor, these supports being possibly plates pierced with openings or articulated parallelograms.

Therefore, according to the invention, there has been made a device for taking containers out of a pile which is particularly reliable, simple and which provides the advantage of being in a condition to immediately conform to any container shape or dimension.

The invention is in no way limited to the embodiment desscribed and illustrated which has been given by way of example only.

Thus, the small rods of the articulated parallelograms may be made of any material and have any shape; they may for example be wall-shaped.

Similarly, the nuts 13 slidably mounted in the plate 6, as seen in FIG. 3, may have any appropriate shape for them to be coupled to the connecting rod 15 and to the jacks 17 and 20.

Therefore, the invention comprises all the technical equivalents of the means described as well as the combinations thereof provided that these are carried out according to its spirit.

What is claimed is:

1. A device for taking containers such as cups out of at least one pile, comprising:
   a supporting frame including openings through which said containers can pass;
   a magazine comprising at least a first deformable parallelogram linkage hinged on and above said frame and including four hinged links hingedly connected to one another to conform to any shape and dimension of containers therebetween;
   means for taking the containers one by one from the pile of containers in the magazine, comprising at least second and third superimposed deformable parallelogram linkages hinged on and underneath said frame, each of the second and third linkages including four hinged links hingedly connected to one another to conform to any shape and dimension of containers therebetween; and
   means for controlling the deformation of said first, second and third deformable parallelogram linkages simultaneously and independently from each other.

2. A device according to claim 1, wherein said controlling means comprises
   a system with rods and nuts mounted on said frame and connected to said first, second and third deformable parallelogram linkages respectively for simultaneously deforming and conforming the same to the shape and dimension of the containers, and two jacks associated with said system and adapted to control the deformation of said superimposed second and third parallelogram linkages respectively and independently from each other and from said first parallelogram linkage.

3. A device according to claim 1, wherein said second and third deformable parallelogram linkages each include at least one tongue projecting towards an interior area between the links and adapted to support said containers by the rims thereof.

4. A device according to claim 1, wherein said magazine comprises vertical rods for guiding piled up containers, said rods being respectively coupled to the four hinged links of said first deformable parallelogram linkage.

5. A device according to claim 1, wherein said first, second and third parallelogram linkages each comprise a row of deformable parallelograms made of a plurality of interconnected hinged links.

* * * * *